No. 880,772. PATENTED MAR. 3, 1908.
A. J. BALDWIN.
METHOD OF MAKING WIRE GLASS.
APPLICATION FILED JULY 21, 1905.
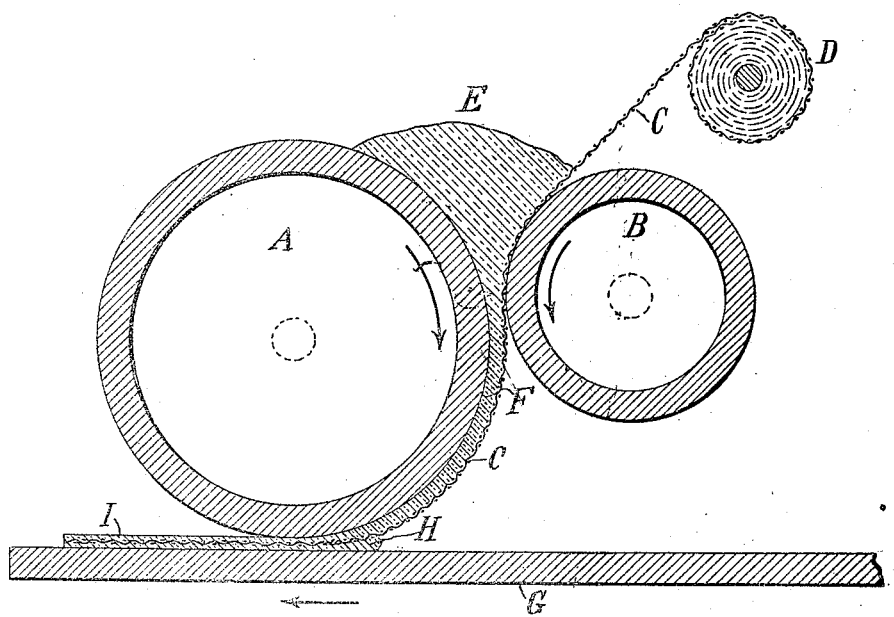

UNITED STATES PATENT OFFICE.

ARTHUR J. BALDWIN, OF EAST ORANGE, NEW JERSEY.

METHOD OF MAKING WIRE-GLASS.

No. 880,772.  Specification of Letters Patent.  Patented March 3, 1908.

Application filed July 21, 1905. Serial No. 270,602.

*To all whom it may concern:*

Be it known that I, ARTHUR J. BALDWIN, a citizen of the United States, residing at East Orange, county of Essex, State of New Jersey, have invented a certain new and useful Method of Making Wire-Glass, of which the following is a specification, reference being had to the drawing accompanying and forming part of the same.

My invention relates to the manufacture of sheet glass having a reticulated strengthening structure embedded therein, the product being known commercially as "wire glass" and has for its object to provide a process which will produce such glass rapidly and in a thoroughly efficient and economical manner.

The invention will be more readily understood when explained in connection with the accompanying drawing, which shows in section a simple and convenient apparatus for practicing my method.

A and B are two rollers, driven at the same peripheral speed and spaced apart a distance somewhat greater than the thickness of the desired sheet of glass. Over the latter roller passes a strip of wire fabric C, drawn from any suitable supply thereof, as for example, the roll D. Between the two rollers is deposited a mass of plastic glass E, which, by the action of the rollers A and B rotating in the direction of the arrows, is rolled out into a sheet, as at F, with the wire fabric on the outer side thereof. Adhering to the roller A the sheet F is carried down to a rolling surface, in the present instance a table G, moving in the direction of the arrow with a lineal speed equal to the peripheral speed of the co-acting roller. The table G and roller A are spaced apart a distance equal to the thickness which the finished sheet is to have. It will be remembered that the sheet F, having been formed between the rollers A and B is considerably thicker than this; hence when it enters the space between the table and its coöperating roller a portion of the glass is progressively forced through the meshes of the wire fabric and banks up below the same, as at H. This mass of glass H is carried under the roller A by the forward movement of the table G, and is rolled out into a layer on the wire fabric C, fresh additions of glass being constantly made to the mass H in the manner already described, that is, by being forced through the meshes of the wire fabric by the pressure of the roller A. The finished plate of glass, with the wire fabric embedded therein is shown at I.

The relative distance between the rollers A and B, and the roller A and table G, have an important bearing on the operation of the machine. In general it may be said that with the latter space or distance equal to one-half the former, the wire fabric will be embedded quite accurately at the center of the finished sheet; lessening the distance between the two rollers will cause the fabric to assume a position nearer to the lower surface of the sheet I, while increasing the distance between the rollers will have the opposite effect; so that it is only necessary to properly proportion the distances between the rollers and between the table and the roller which coöperates therewith, to produce practically any desired result as regards the position of the wire fabric in the finished sheet.

It is not always necessary to actually force glass through the meshes of the wire fabric to produce the mass H, since if the glass of the sheet F is plastic enough it will pass of its own weight through the meshes and hang from the sheet in the form of convex masses. As these come under the roller A and in contact with the table they are flattened out and formed into a smooth layer upon the wire fabric. Additional glass may be forced through by the action of the roller and table as already described. This method of passing glass through the meshes of the fabric, that is, by the action of gravity, I do not claim specifically herein.

It is to be understood of course that the apparatus described herein is merely a convenient one for practicing my invention, which, being a method, is independent of any particular kind of apparatus or machine for performing it.

What I claim is:

1. The method of making wire glass, which consists in forming a sheet of glass with a wire fabric on one surface thereof, progressively subjecting all portions of the sheet equally to pressure, to force a portion of the glass through the meshes of the fabric, and simultaneously forming said portion of glass into a smooth uniform layer on the fabric, as set forth.

2. The method of making wire glass, which consists in forming upon a roller a sheet of glass with a wire fabric on the outer surface thereof, and progressively passing the said sheet between the said roller and another rolling surface to force a portion of the glass through the meshes of the fabric and simultaneously form the said portion into a uniform smooth layer on the fabric, as set forth.

ARTHUR J. BALDWIN.

Witnesses:
EDWARD T. MAGOFFIN,
S. S. DUNHAM.